United States Patent Office 3,576,758
Patented Apr. 27, 1971

3,576,758
TREATMENT OF POLYPEPTIDE-CONTAINING HYDROPHILIC POLYMERIC CAPSULE WALL MATERIAL WITH URANIUM AND VANADIUM COMPOUNDS
Donald D. Emrick, Kettering, Ohio, assignor to The Nationay Cash Register Company, Dayton, Ohio
No Drawing. Filed Oct. 17, 1966, Ser. No. 586,943
Int. Cl. A01n 17/00; B01j 13/02; B44d 1/44
U.S. Cl. 252—316                                                    6 Claims

ABSTRACT OF THE DISCLOSURE

A process is provided for manufacturing novel, minute, capsules en masse wherein preformed capsules having walls of polypeptide-containing hydrophilic polymeric material are further treated by uranyl or vanadyl ions in an aqueous liquid vehicle. Capsules produced by practice of this process have walls which exhibit decreased water solubility, decreased swelling in water, and decreased sensitivity to high relative humidity.

This invention pertains to a method for improving the physical characteristics of minute capsules by treating, en masse, the polypeptide-containing, hydrophilic, polymeric material walls wherein the treatment materials comprise aqueous solutions of uranyl and vanadyl ions, and to the capsule product thereby produced.

It more specifically relates to the treatment, in an aqueous medium, of such capsule walls of polymeric material while the said walls are in a solvent-swollen state, and the treatment utilizes aqueous solutions of the treatment materials. The novel treatment involves the reaction, by coordination bonding, of nitrogen atoms of amino or amido chemical groups present in the polymeric material with dissolved ions of uranium or vanadium in the uranyl or vanadyl state. Coordination bonding or complexing between the metal ions and the capsule wall materials, as mentioned above, results in a water-insoluble polymeric material which has qualities admirably adapted for use as capsule walls in cases where good retention of volatile capsule contents in high humidity environments is required.

It had been found, through a study, by applicant, of the mineralization of the bone structure and other tissue of fossil remains of living matter, that such remains evidently selectively extracted, out of the matrix material and the ground waters in which such were embedded, the minerals vanadium and uranium where such were available. It was deduced by applicant that the protein matter was involved, and this led to a suspicion, later justified by experiment, that the precursors and decomposition products of gelatin were involved. Thereupon the use of salts of uranium and vanadium was tested with respect to the treatment of the delicate coacervate gelatin-containing membranes surrounding minute capsules made en masse according to the teachings of Barrett K. Green as disclosed in U.S. Pat. No. 2,800,458, issued July 23, 1957, and reissued on Nov. 29, 1960, as Re. 24,899. Surprisingly good results were obtained from the use of salts having uranyl ($UO_2^{++}$) and vanadyl ($VO^{++}$) ions.

The complexing of gelatin, gelatin or collagen derivatives, and other polypeptides is preferrably accomplished by treatment with water-soluble uranyl ($UO_2^{+2}$) and vanadyl ($VO^{+2}$) and can be accomplished using certain other transition metal compounds having inner electron orbitals which are capable of coordinating with or accommodating the free nitrogen electrons of the amino and amido functionality of the organic polypeptide material. The resultant wholly or partially metal-ion-complexed polypeptides, either in the presence or in the absence of other, mutually compatible, polymeric material components such as negatively charged polyelectrolytes (gum arabic, carrageenan, hydrolyzed copolymers of ethylene and maleic anhydride, hydrolyzed copolymers of methyl vinyl ether and maleic anhydride, or hydrolyzed copolymers of styrene and maleic anhydride), frequently display decreased water solubility, decreased swelling, and decreased sensitivity to high humidity relative to the same polypeptides in the absence of the subject metal complexing reaction.

The processes of this invention and the encapsulation products obtained therefrom are as useful for industrial applications and in the arts and sciences as are the encapsulation techniques and the encapsulated products therefrom described in the aforesaid U.S. Pat. No. 2,800,-458, as well as what is described in U.S. Pat. No. 2,800,457, issued July 23, 1957, on the application of Barrett K. Green and Lowell Schleicher, to which reference is made. Capsules manufactured by the novel process are used for the same purposes as untreated capsules; that is, to contain adhesive solvents and adhesive systems, to protect delicate and reactive chemicals and compositions, and to serve as minute dispensing and containing units for various materials and mixtures of materials. Minute capsule utility is also described at some length in the publication "NCR Capsules Have Wide Possibilities," an article published in the NCR Factory News, October 1959, a publication of The National Cash Register Company, Dayton, Ohio, United States of America. The subject treated capsule walls have been found to exhibit improved characteristics with regard to retention and protection of the contained materials and, in that respect, allow a broadening of the possibilties for usefulness of encapsulated materials in the protected minute entity form, especially in the case of high relative humidity capsule storage conditions.

Eligibility of a material for being encapsulated in an aqueous medium depends upon low water solubility and chemical inertness to the various hydrophilic-polymeric-capsule-wall-forming materials. Included as a few examples of the vast number of materials which can be encapsulated by the novel method are inorganic solids such as water-insoluble salts and oxides, pigments, and minerals; organic solids such as water-insoluble polymeric materials, high-molecular-weight fats and waxes, and other, more complex, materials, including insecticides, rubbers, adhesives, catalysts, and the like; and liquids such as toluene, xylene, hexane, carbon tetrachloride, silicone fluids, methyl salicylate, lemon oil, mineral oil, and the like.

It is believed that inhibition of water or water vapor into capsule walls of hydrophilic, polymeric materials is an important factor in the loss of volatile capsule contents by diffusion through the wall. Capsule walls which have been treated by the novel method are more hydrophobic than untreated capsule walls; that is, the treated capsule walls are not so subject to the wall-swelling effects of moisture, humidity, and the consequent diffusion through the wall of capsule contents as are the untreated capsule walls. The novel treated capsules exhibit improved retention of capsule contents at moderate temperatures and over the whole range of relative humidity conditions, the improved retention being more dramatically demonstrated as the relative humidity is raised above 85 percent. Tests, under carefully controlled high relative humidity (85 to 95 percent) conditions, have shown that the novel treated capsule wall material retains volatile organic solvents to a markedly more successful degree than does the same capsule wall material left untreated. It is, therefore, an object of this invention to provide a method for preparing, en masse, minute capsules having hydrophilic polymeric material capsule walls chemically treated and characterized by improved resistance, in high humidity environments, to loss of capsule contents by diffusion through the wall.

The polypeptide-complexing metal compound can be dissolved into intended liquid capsule core material prior to dispersion of the said core material into droplets in an aqueous solution of the polypeptide-containing polymeric material. The complexing metal ions in solution in the core entity droplets meet and complex with the polypeptide material at the interface between the core entity droplets and the solution of polypeptide material, thus forming a skin or membrane around individual droplets which can serve as a capsule wall.

It is an object of this invention to provide such a method utilizing an interfacial interaction for the en masse preparation of minute capsules having, as capsule walls, a complexed polymeric material comprising a hydrophilic film-forming material and a complexing metal compound.

In another, and preferred, case, a previously or independently phased-out polypeptide material from a homogeneous solution, as described in U.S. Pat. No. 2,800,457, before mentioned, may be subsequently treated with a solution of a water-soluble, polypeptide-complexing metal compound, of the type specified, in order to accomplish the desired complexing or degree of complexing—the degree of such complexing being regulated by control of the pH, temperature, and component concentration; by proper selection of the complexing metal compound used; or by the duration of exposure to or contact with solutions of the metal compound, or alternately, by either incremental, regulated, or otherwise limited addition of said complexing metal compound, or by otherwise regulating the contact duration and mode of contact.

It is a further object of this invention to provide such a method for the post-treatment of the embryonic capsule walls by the use of polypeptide-complexing metal compounds, said capsule walls including at least one hydrophilic polypeptide material.

In connection with any of the above-mentioned procedures utilizing polypeptide-containing capsule wall materials, additional—optional—treatments or capsule wall modification procedures can be utilized with the subject polypeptide-complexing reactions. One non-limiting type of such capsule wall treatment is to utilize glutaraldehyde, formaldehyde, glyoxal, or other aldehyde materials to further effectively harden or cross-link the polypeptide or its complexes present in the capsule walls. In order to modify or ameliorate any tendency for undesirable wall embrittlement due to the novel polypeptide-complexing reaction, with or without additional hardening or crosslinking, known polypeptide plasticizers may be incorporated with the polypeptide (a) previous to the polypeptide-complexing reaction, (b) during the complexing, or (c) as a post-treatment after the polypeptide complexing has been accomplished. A group of such plasticizers includes soluble plant gums, such as gum arabic; mono-, di-, and poly-saccharide sugars; polyhydric alcohols such as mannitol or sorbitol made by the reduction of such sugars; alkylene glycols or glycol derivatives; glycerol; or certain highly polar hydrophilic solvents such as phthalonitrile, acetamide, formamide, dimethylformamide, dimethylsulfoxide, which either may or may not competitively complex with the same metal ions used to complex the polypeptide component of the capsule wall material.

Examples of soluble metal compounds suitable for complexing gelatin film, gelatin-derivative or collagen-derivative film, dispersed collagen, zein, and other polypeptide material films include uranyl nitrate, acetate, sulfate, and halides; ammonium uranyl carbonate; and vanadyl formate, acetate, sulfite, or halides.

The use of chromium salts in leather and collagen tanning and in the hardening or shrinking of gelatin films is well known. Similarly, the action of light upon dichromate-treated or chromic-acid-treated gelatin plates in photoengraving is well known and old. The use of zirconyl ($ZrO^{++}$) ions in forming a complex with hydrophilic colloids such as gelatin, sodium alginate, albumin, agar-agar, and gum karaya in the preparation of capsules is described in U.S. Pat. No. 3,201,353, issued Aug. 17, 1965, on the application of Leo D. Corben. The use of water-soluble chromium and zirconium salts in leather and collagen tanning is extensively discussed in "Chemistry and Technology of Leather," volume 2 (A.C.S. Monograph Series No. 134), edited by F. O'Flaherty, W. T. Roddy, and R. M. Collar, 1958, Reinhold Publishing Corporation, New York, N.Y., United States of America.

With the above objects and description in mind, specific examples will now be disclosed, from which further features of the invention will become apparent to those skilled in the art. It is understood, as obvious, that the use of specific materials in the following examples serves an illustrative purpose and is not intended to limit the broad scope of this invention in any way.

EXAMPLE 1

An 11 percent, by weight, aqueous solution of pigskin gelatin having a Bloom strength of 285 to 305 grams and an iso-electric point of pH 8 to 9 was prepared, and the pH was then adjusted to 9.0 with 20 percent, by weight, aqueous sodium hydroxide solution. The temperature was adjusted to 55 degrees centigrade. To 800 milliliters of stirred distilled water at 55 degrees centigrade were added 150 milliliters of the warmed gelatin solution, 180 milliliters of 11 percent, by weight, warmed (55 degrees centigrade) aqueous gum arabic solution, and 80 milliliters of a 2 percent, by weight, aqueous solution of a mixture of sodium-hydroxide-neutralized copolymers of ethylene and maleic anhydride (a one-to-one, by weight, ratio of "EMA-21" and "EMA-31," which are poly(ethylene-co-maleic anhydride) materials having molecular weights of about 6,000 and 60,000 to 70,000, respectively, as sold by Monsanto Chemical Company, St. Louis, Mo., United States of America). The pH of the resultant gelatin-gum arabic-copolymer mixture, at the temperature of 55 degrees centigrade, was adjusted to 6.5 in order to cause optimum emergence of the wall-forming, coacervate, phase. To the stirring mixture was then added 250 milliliters (217 grams) of toluene to serve as capsular internal phase for this example. The speed of stirring was adjusted to produce a dispersion of toluene droplets about 1,000 to 1,500 microns in diameter. The stirring mixture was allowed to cool to 25 degrees centigrade over about a two-hour period, during which time the once-liquid coacervate phase encased the toluene droplets and gelled. The mixture, now including capsules, was chilled to 10 degrees centigrade, and the pH was adjusted to 4.5 using 14 percent, by weight, aqueous acetic acid solution. The system was chilled to 5 degrees centigrade, at which point 9.75 milliliters of 25 percent, by weight, aqueous glutaraldehyde solution and 380 milliliters of 2 percent, by weight, aqueous uranyl nitrate hexahydrate solution were added to the system. The capsule-containing system was then stirred at a temperature of about 0 to 5 degrees centigrade for about sixteen hours, and the capsules were separated from the supernatant liquid by centrifugal-spin-filtration, washed with 600 milliliters of cold distilled water, mixed with about five times their bulk volume of granulated cork (having an average particle diameter of about 2.0 to 2.4 milliliters), and dried on a forced-air blower.

Dry capsules were recovered from the cork by sieving, and the yield of dry, yellow-orange-colored, 1,400 to 2,000 micron capsules was 200 grams.

EXAMPLE 2

This example is identical with Example 1, above, except that 380 milliliters of a 5 percent, by weight, aqueous solution of uranyl nitrate hexahydrate was used instead of the 2 percent solution. The yield of dry, yellow-orange-colored, 300- to 1,000-micron capsules was about 175 grams.

EXAMPLE 3

The same procedure as in Example 1, above, was followed except that no glutaraldehyde was utilized.

The yield and the gross appearance of the dry yellow-orange-colored capsules was similar to that obtained in Example 1.

This example was also repeated with xylene substituted, volume for volume, for toluene as the capsule internal phase. The results were substantially identical with those described above.

EXAMPLE 4

The same procedure as in Example 1, above, was followed except that 40 grams of "Arlex," which is an 85 percent, by weight, aqueous solution of sorbitol and related polyhydric materials as sold by Atlas Chemical Industries, Incorporated, Wilmington, Del., United States of America, was used, together with the indicated quantities of gelatin, gum arabic, poly(ethylene-co-maleic anhydride) material mixture, and glutaraldehyde, in order to somewhat plasticize the capsule walls.

EXAMPLE 5

This example is identical with Example 1 except that 380 milliliters of cold, 0.62 percent, by weight, aqueous vanadyl formate solution was substituted for the uranyl nitrate hexahydrate. The pH of the system for capsule wall treatment in this example was 4.5.

EXAMPLE 6

The same procedure as in Example 5, above, was followed except that 380 milliliters of a 2 percent, by weight, aqueous vanadyl formate solution was substituted for the uranyl nitrate hexahydrate solution.

EXAMPLE 7

The same procedure as in Example 5, above, was followed except that 40 grams of "Arlex" was used together with the indicated quantities of gelatin, gum arabic, poly(ethylene-co-maleic anhydride) material mixture, and glutaraldehyde, in order to plasticize the capsule walls.

The 100- to 300-micron capsules were washed with cold distilled water before being isolated and dried in the usual manner. The capsule product was dark green in color.

EXAMPLE 8

Forty grams of succinylated calfskin gelatin (sold as "Type 2001" by Kind & Knox Gelatin Company, Camden, N.J., United States of America) was dissolved in 560 grams of distilled water which had been warmed to 55 degrees centigrade. Two hundred grams of an aqueous 20 percent, by weight, sodium sulfate solution was added to the gelatin solution, and the pH was adjusted to 4.3 with 14 percent, by weight, aqueous acetic acid. The temperature was adjusted to 37 to 39 degrees centigrade. The liquid internal phase to be encapsuled—200 milliliters of toluene—was then added to the agitating system and was dispersed to 100- to 300-micron diameter droplets, the temperature being maintained at 37 to 39 degrees centigrade. The stirred mixture was then slowly cooled to about 25 to 26 degrees centigrade, most of the gelatin wall material being deposited about the internal phase at approximately 33 degrees centigrade. The mixture was cooled in an ice bath to 5 to 10 degrees centigrade, and then 800 milliliters of 20 percent, by weight, aqueous solution of sodium sulfate, at a temperature of about 30 to 40 degrees centigrade, was slowly added. The temperature was again adjusted to 10 degrees centigrade, and, after stirring for about one hour, 300 milliliters of a 4 percent, by weight, aqueous solution of uranyl sulfate trihydrate was added. Concentrated aqueous ammonia was added dropwise to the chilled system to produce a pH of 5.15, and then the mixture was stirred for seventeen hours, during which time the temperature gradually rose to 24 degrees centigrade. The resultant capsules were separated from the supernatant liquid by vacuum filtration, and the recovered capsules were then washed with 300 milliliters of cold distilled water, refiltered, and washed again with 600 milliliters of cold water before the final vacuum filtration. The capsules were spread out over a three-square-foot area, and the capsule walls were dried under a stream of moving warm air for five and one half to six hours, with occasional stirring. The yield of yellow capsules was 97 grams.

The above example was repeated with limonene, an oily liquid, substituted volume for volume for toluene as the capsule internal phase. The results were substantially identical with those described above.

EXAMPLE 9

The same procedure as in Example 8, above, was followed except that 285 milliliters of a 4 percent, by weight, aqueous solution of vanadyl sulfate was utilized in place of the uranyl sulfate trihydrate solution of Example 8. Furthermore, an adjusted pH of 4.3 was utilized (accomplished by addition of 10 percent, by weight, aqueous sodium hydroxide solution) instead of the pH of 5.15 of Example 8.

The yield of similarly water washed, dry, blue-black, 100- to 300-micron spherical capsules was 138 grams.

The above example was repeated with methyl salicylate substituted, volume for volume, for toluene as the capsule internal phase. The results were substantially identical with those described above.

EXAMPLE 10

An eleven percent, by weight, solution of the specified pigskin gelatin was prepared in warm (55 degrees centigrade) distilled water, and the solution pH was adjusted to 9.0 with 20 percent, by weight, aqueous sodium hydroxide solution. To 200 grams of distilled water were added 180 grams of the above gelatin solution, and 200 grams of toluene, which was to be used as the capsule internal phase. The warmed mixture was agitated to obtain a dispersion of toluene droplets having an average diameter of about 100 to 300 microns. The agitation speed was reduced somewhat, and 100 grams of an 11 percent, by weight, aqueous gum arabic solution was slowly added, followed by 25 milliliters of a 5 percent, by weight, aqueous solution of sodium-hydroxide-neutralized copolymer of methyl vinyl ether and maleic anhydride ("Gantrez AN," sold by General Aniline and Film Corporation, New York, N.Y., United States of America, having a specific viscosity of 0.8 to 1.2 in ethyl methyl ketone at 25 degrees centigrade) having an adjusted pH of 8.0. Both solutions had been previously warmed to 55 degrees centigrade. An additional 800 milliliters of warm distilled water was then slowly added, after which addition the pH of the mixture was reduced to 6.2 by addition of 15 percent, by weight, aqueous acetic acid. The mixture was then slowly stirred and gradually cooled to about 22 to 25 degrees centigrade over a period of three hours. The stirred system, then containing capsules, was chilled in an ice bath to 5 to 10 degrees centigrade. The pH of a 2 percent, by weight, aqueous solution of uranyl nitrate hexahydrate was carefully adjusted to incipient precipitation by the addition of concentrated aqueous ammonia and was then slowly added, at a temperature of 10 degrees centigrade, to the capsule-containing manufacturing liquid. The mixture was stirred at 5 to 10 degrees centigrade for an additional hour, and the pH of the system was, thereafter, adjusted from 6.8 to 4.5 by addition of aqueous acetic acid. Thirty minutes later, 20 milliliters of 25 percent, by weight, aqueous glutaraldehyde solution was added, and the mixture was allowed to stir for about seventeen hours while gradually warming to room temperature. The mixture was re-chilled to 10 degrees centigrade, and the capsules were then separated from the supernatant liquid by centrifugal-spin-filtration. The recovered capsules were washed with 600 milliliters of cold distilled water, and the supernatant wash liquid was again filtered. The resultant wet capsule cake was mixed with about six times its bulk volume of granulated cork, and was dried in a stream of moving air for four hours. The dry capsules were separated from the cork by sieving. The yield of dry, spherical, yellow-brown, 100- to 500-micron capsules was about 160 grams.

This example was repeated with trichlorodiphenyl, an oily liquid, substituted for toluene, volume for volume, as the capsule internal phase. The results were substantially identical with those described above.

EXAMPLE 11

The same procedure as in Example 10, above, was followed except that a dispersion of 5.5 grams of finely powdered vanadyl acetate in a solution of 3.75 milliliters of glacial acetic acid and 375 milliliters of water was substituted for the aqueous solution of uranyl nitrate hexahydrate of Example 10. In both examples, the pH of the final aqueous medium was adjusted to 4.5.

The yield of similarly water-washed, dry, pale green, spherical, 100- to 400-micron capsules was about 120 grams.

EXAMPLE 12

To 400 milliliters of distilled water were added 90 milliliters of an 11 percent, by weight, aqueous solution of the specified pigskin gelatin and 90 milliliters of an 11 percent, by weight, aqueous gum arabic solution. The pH of the mixture was adjusted to 4.3 at a temperature of 40 degrees centigrade. As the liquid internal phase—125 milliliters of toluene—was added, the rate of stirring was adjusted to produce droplets of approximately 1,000 microns in diameter. The stirring mixture was allowed to cool slowly to room temperature to form gelled capsule walls and was then quickly chilled to 10 degrees centigrade before treatment of the so-formed walls. One hundred and ninety milliliters of a 0.62 percent, by weight, aqueous vanadyl formate solution having the pH adjusted to 4.3 was added to the system, followed by 5 milliliters of 25 percent, by weight, aqueous glutaraldehyde solution. The mixture was then stirred for sixteen hours at a temperature of 10 to 15 degrees centigrade. The resultant capsules were washed with cold distilled water, recovered, and dried as usual. In both cases, blue-green-colored capsules were obtained.

EXAMPLE 13

Into a 1,500-milliliter vessel equipped for heating and agitation and containing 610 grams of water was placed 15 grams of the specified gelatin. The mixture was stirred and warmed until a temperature of 50 degrees centigrade was attained and the gelatin was in solution. The pH of the warmed solution was then adjusted to 6.4, and 130 milliliters of toluene was dispersed in the system, with the agitation adjusted to yield toluene droplets having diameters of approximately 100 to 500 microns. To this dispersion was added, in a dropwise fashion over a period of fifteen to twenty minutes, 240 grams of a 0.5 percent, by weight, aqueous carrageenan solution. The carrageenan used was in the sodium salt form ("Viscarin 402" sold by Marine Colloids, Incorporated, Rockland, Maine, United States of America), and the carrageenan solution had been adjusted to pH 6.8 and 50 degrees centigrade prior to use. The stirred system, now at a temperature of 50 degrees centigrade and containing liquid-walled capsules, was allowed to cool slowly to about 25 to 35 degrees centigrade to gel the capsule walls. At this lower temperature, 200 milliliters of a 3 percent, by weight, aqueous uranyl nitrate hexahydrate with the pH adjusted to 5.2 was added to the stirring system. The resulting capsule dispersion was stirred overnight at a temperature of 20 to 25 degrees centigrade, and the capsules were isolated by being dried in the same manner as in preceding examples.

EXAMPLE 14

The same procedure as in Example 13, above, was followed except that the uranyl nitrate hexahydrate solution of Example 13 was replaced by a system consisting of 4.5 grams of vanadyl acetate which had been triturated in 4.5 milliliters of glacial acetic acid and added to 200 milliliters of water containing 4.5 milliliters of 28 percent, by weight, aqueous ammonia solution.

Both Example 13 and Example 14 were repeated using trichlorodiphenyl as the capsule internal phase. The results were substantially the same as with toluene.

It can be understood, from the preceding examples, that the process of the invention is broad in its general application to the treatment of capsules. Treatment material concentrations have been shown to be variable over a wide range, and combinations of different vanadyl- and uranyl-containing treatment materials can be successfully used. The temperature of treatment is variable, depending on materials and concentrations, within the wide range of about 0 to 55 degrees centigrade or perhaps slightly higher—25 to 30 degrees centigrade being used in the examples for convenience of operation. The capsule walls to be treated can consist of a variety of materials and can include one or more hydrophilic materials, plasticized or not, and can optionally be chemically hardened prior to the treatment provided by this invention. The invention will be claimed broadly.

What is claimed is:

1. A process for treating, en masse, the polypeptide-containing hypdrophilic polymeric material walls or minute capsules with a polypeptide treatment material selected from the group consisting of vanadyl and uranyl ions in aqueous solution, said treatment improving retention and protection characteristics of the capsule walls and comprising the steps of:
    (a) establishing an agitated aqueous system of such capsules having water-swollen walls,
    (b) introducing into the system, once established, an aqueous solution of said treatment material, and
    (c) maintaining the system for a time sufficient to accomplish complexing of capsule wall material with treatment material.

2. A minute capsule having a wall comprising the product of reaction between at least one polypeptide-containing hydrophilic polymeric material and at least one material selected from the group consisting of vanadyl ions in aqueous solution and uranyl ions in aqueous solution.

3. The process of claim 1 wherein the capsule walls have been chemically hardened prior to the said treatment.

4. The capsule of claim 2 wherein the said capsule wall also contains a plasticizing material.

5. A process for treating en masse the amino and amido chemical groups present in the hydrophilic amido-, amino-containing polymeric material walls of minute capsules with at least one treatment material taken from the group consisting of vanadyl and uranyl ions in aqueous solution, said treatment improving retention and protection characteristics of the capsule walls and comprising the steps of:
(a) establishing an agitated aqueous system of the capsules having water-swollen walls,
(b) introducing into the system, once established, an aqueous solution of said treatment material, and
(c) maintaining the system for a time sufficient to accomplish complexing of capsule wall material with treatment material.

6. A minute capsule having a well comprising the product of reaction between the amino and amido chemical groups present in at least one hydrophilic polymeric material included in said capsule wall and at least one material selected from the group consisting of vanadyl ions in aqueous solution and uranyl ions in aqueous solution.

References Cited

UNITED STATES PATENTS

| 2,800,458 | 7/1957 | Green | 252—316 |
| 3,092,553 | 6/1963 | Fisher et al. | 252—316X |

FOREIGN PATENTS

| 929,404 | 6/1963 | Great Britain | 252—316 |

RICHARD D. LOVERING, Primary Examiner

U.S. Cl. X.R.

117—62.2, 100; 424—33, 34, 36, 37